Sept. 12, 1967   S. V. DIVERS   3,341,678
SPARK EROSION MACHINE
Filed June 12, 1963
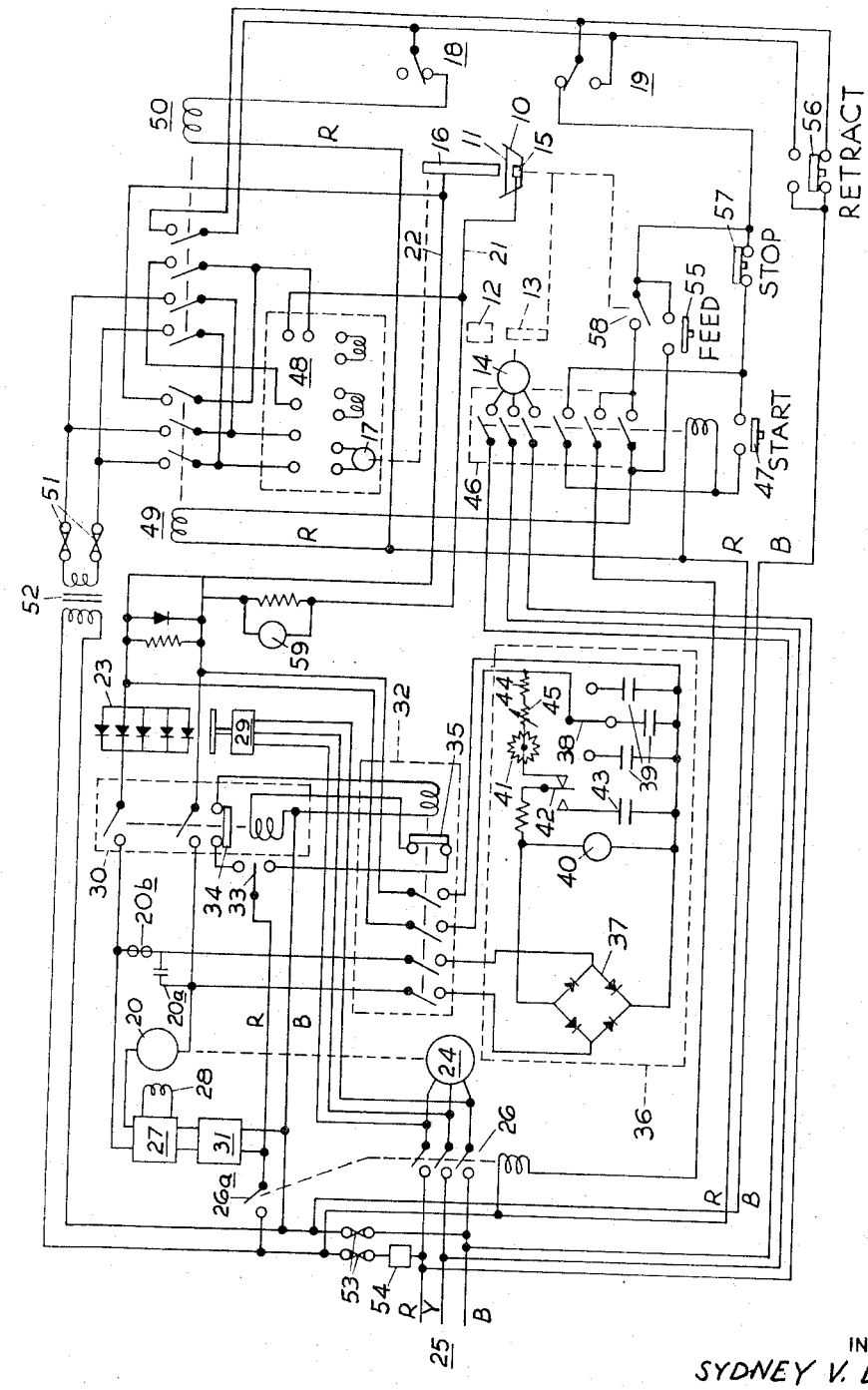
INVENTOR:
SYDNEY V. DIVERS
BY

United States Patent Office 3,341,678
Patented Sept. 12, 1967

3,341,678
SPARK EROSION MACHINE
Sydney V. Divers, Bletchley, England, assignor to
Linderfort Limited, Bletchley, England
Filed June 12, 1963, Ser. No. 287,426
3 Claims. (Cl. 219—69)

This invention concerns spark erosion machines wherein a workpiece is eroded by causing production of successive electrical sparks between an electrode and the workpiece whilst the latter is submerged in a protective liquid, such as paraffin.

Hitherto, spark erosion processes have been extremely slow. This is because it has been usual to produce the sparks by means of a relaxation capacitor circuit, and the time taken for recharging the capacitor or capacitors after discharge is considerably longer (e.g. about a thousand times longer) than the discharging time. Attempts have been made to utilise direct current from a generator for creating the sparks, but these have not been materially successful in improving erosion speed, primarily because it has been thought to be necessary to simulate the electrical conditions prevailing in a relaxation capacitor circuit with the consequence that these arrangements have provided for propagation of sparks at comparatively long intervals.

An object of this invention is to provide an arrangement wherein the erosion process can be speeded up considerably as compared with prior known proposals, and with this object in view the present invention provides a spark erosion machine comprising an alternator, a rectifier, and an electrode there being means operable to move the electrode relative to a workpiece in dependence upon a potential existing therebetween, and means for closely stabilising the current output of the alternator.

The alternator is preferably provided with a carbon pile or transistorised current controller whereby its current output is stabilised, and the rectifier may conveniently comprise a bank of silicon rectifier elements which are air cooled by a positive air current provided by a fan.

The circuits from the alternator to the electrode may, if desired, include also an auxiliary relaxation capacitor circuit by which sparks may be produced at the electrode as an alternative to current passing through the rectifier.

In the latter instance the relaxation capacitor circuit may include a plurality of capacitors of different capacitances, these being arranged for selective inclusion into the relaxation capacitor circuits.

In order that the invention may be fully understood, it will be described further, by way of example, with reference to the accompanying drawing in which the single figure is a circuit diagram of one practical form of spark erosion machine in accordance with the invention.

The spark erosion machine illustrated comprises a tank 10 for containing a suitable protective liquid 11, such as paraffin (which can be pumped between the tank 10 and a reservoir 12 by a pump 13 powered by a pump motor 14. The pump 13 may, also, advantageously recirculate the liquid 11 through the tank 10 and a filter (not shown) preferably of the centrifuge type, for removing eroded particles from the liquid 11. Although the reservoir 12 has been shown above the tank 10 in the drawing, this is only for convenience of illustration, and in actual fact the reservoir 12 will normally be below the tank 10.

The tank 10 serves for the reception of a workpiece indicated diagrammatically at 15, to be eroded, and disposed above the tank 10 and in alignment with the workpiece 15 is an electrode indicated diagrammatically at 16. This electrode 16 is adapted to be lowered onto the workpiece 15, or raised from the workpiece 15, by a servo-motor or reversible motor 17.

Associated with the electrode 16 are a top limit switch 18 arranged so as to be actuated when the electrode 16 has reached its uppermost end position and a bottom limit switch 19 arranged to be actuated when the electrode 16 has reached a desired lowermost end position, for reasons which will hereinafter be explained in detail. The bottom limit switch 19 is adjustable relative to the workpiece 15, so as to permit predetermination of the amount by which the workpiece will be eroded, as will hereinafter be set forth.

The workpiece 15 and the electrode 16 are fed with current from a single phase alternator 20 through leads 21 and 22 via a rectifier 23 composed of a bank of silicon rectifier elements so that the current reaching the workpiece 15 and the electrode 16 is a half-wave rectified alternating single phase current.

The alternator 20 is driven by a motor 24 supplied with three-phase mains current at 25 through a motor starting switch 26, and a carbon pile current controller 27 associated with the alternator 20 serves to stabilise the current output from the latter to a desired practical maximum, for example, 300 amperes at 15 volts, by controlling the current in the field windings 28 of the alternator 20. A capacitor 20a is connected across the output of the alternator 20 and a fusible link 20b is provided in a feed line from the alternator 20 to a rectifier arrangement 37 to be described later.

Also controlled by the motor-starting switch 26 is a rectifier fan 29 adapted to produce a current of air for cooling the silicon rectifier 23.

Disposed in the leads 21 and 22 so as to control the current to the electrode 16 and workpiece 15 is an erosion switch 30 whose coil is adapted to be fed with current from one phase of the three phase supply 25 and is connected in parallel with the input of a field rectifier/transformer 31 the output of which is coupled with the carbon pile current controller 27 and the alternator field windings 28.

Disposed in parallel with the coil of the erosion contactor 30 is the coil of a relaxation capacitor circuit switch 32, these two coils being arranged for selective alternative energisation by means of a manually operable key switch 33. The erosion switch 30 and the relaxation capacitor circuit switch 32 each includes a respective switch 34, 35 controlling the other, so that when one of these two switches is energised the other is open circuited, and vice versa.

The relaxation capacitor circuits switch 32 serves, under the control of the key switch 33 to couple into the leads 21 and 22, between the electrode 16 and workpiece 15 and the alternator 20, a relaxation capacitor circuit indicated generally at 36. This comprises a full wave rectifier 37 and a manually operable selector switch 38 whereby one of a plurality of different capacitors 39 may selectively be incorporated into the circuit to the workpiece 15. An indicator lamp 40 serves to indicate when the relaxation capacitor circuit 36 is switched into the circuit of the electrode 16 and workpiece 15. These respective capacitors 39 are charged through a circuit including a fixed and a variable resistor 44, 45 respectively.

Incorporated into the relaxation capacitor circuit is a safety device which safeguards against operation of the selector switch 38 during erosion to prevent sparking at the contacts of the selector switch 38 and consequent erosion of such contacts. This comprises a toothed wheel 41 arranged for rotation with the selector switch 38 so as to actuate a switch 42 which interrupts a current supply circuit to the capacitor 39 and which connects instead a reservoir capacitor 43 in circuit during changes from one capacitor 39 to another.

The pump motor 14 is coupled, through a pump motor switch 46, to the three phase supply 25, under control of a manually operable start button switch 47.

The reversible or servo-motor 17 is under the control of an amplifier 48 which is preferably transistorised and which is arranged, through a servo relay 49 and a retract relay 50, to detect variations of voltage drop between the workpiece 15 and electrode 16 from a predetermined optimum working voltage, for example 15 volts. The amplifier 48 is supplied with alternating current through secondary fuses 51 from the output of an amplifier transformer 52, the input of which is supplied with current from one phase of the supply 25 through primary fuses 53 and an overload circuit breaker 54.

The top and bottom limit switches 18 and 19 are connected, as shown, with the start button switch 47 and also a feed button switch 55, a retract button switch 56 and a stop button switch 57 for manual control of feeding and retracting of the electrode 16, and a float switch 58 which is closed when a predetermined level of liquid 11 is present in the tank 10.

To operate the machine, the start button switch 47 is closed temporarily by manual operation. This causes the pump motor switch 46 to be energised and retained with its switches closed, thereby causing the pump motor 14 to run, so pumping liquid 11 into the tank 10 from the reservoir 12. After a maximum level of liquid has been reached in the tank 10, it passes through an overflow pipe (not shown) back to the reservoir 12 which, as previously explained, is disposed at lower level than the tank 10, under the influence of gravity.

When the liquid 11 reaches the desired switching level in the tank 10, the float switch 58 is closed, and since the pump switch 46 is energised, the motor starting switch 26 and the erosion contactor 30 are energised, the latter through contact 26a of contactor 26 as also is the servo relay 49. The fan 29 then operates to cool the silicon rectifier 23.

Since, in the starting condition the electrode 16 is in a retracted position, there is a large negative input error to the amplifier 48 which, accordingly, energises the servo motor 17 to displace the electrode 16 downwardly. This downward displacement continues until the gap between the electrode 16 and the workpiece 15 corresponds to a voltage drop therebetween of the present voltage (e.g. 15 volts) which is optimum for erosion of the workpiece 15 and erosion continues, with the amplifier 48, through its control of the motor windings 17, maintaining the electrode 16 at a substantialy constant distance from the workpiece 15 during the whole erosion process through the servo motor 17.

The bottom limit switch 19 is set to be operated when the electrode 16 has descended a predetermined distance corresponding to the desired depth to which the workpiece 15 is to be eroded.

Operation of the bottom limit switch 19 stops the pump motor 14 so that pumping of the liquid 11 is discontinued, and the liquid 11 which is in the tank falls back, under gravity, through the pump 13 into the reservoir 12.

Simultaneously, the motor switch 26, the erosion switch 30 and the servo switch 49 are all de-energised so that erosion ceases, and detection of the voltage drop across the electrode 16 and workpiece 15 is discontinued by the amplifier. Furthermore, the retract switch 50 is energised, so as to cause the amplifier transformer 52 to supply a current of, say, 16 volts to the amplifier 48, resulting in corresponding energisation of the servo motor 17. The power input to the amplifier is simultaneously tapped and a potential of, for example, 16 volts, is fed, from such tapping, to the detector input of the amplifier to cause the servo motor 17 to raise or retract the electrode 16. Such raising continues, until the top limit switch 18 is actuated by the upward movement of the electrode, whereupon the retract switch 50 is de-energised, and the amplifier is disconnected from any signal with the result that the servo motor 17, and the machine, comes to rest.

Actual speed of erosion can be determined during operation of the machine by means of a shunt connected meter 59 which is suitably calibrated in any desired units.

As will be evident from the foregoing description the current fed to the electrode 16 and workpiece 15 will for normal or coarse erosion, be half wave rectified alternating current fed directly from the alternator 20 at a high frequency, for instance at 1000 cycles per second.

For fine erosion (e.g. for obtaining various surface finishes) the current can be diverted through the relaxation capacitor circuit 36 and any selected one of the capacitors 39 by operation of the key switch and the selector switch 38.

Raising or lowering the electrode 16 independently of the amplifier 48, can of course, be effected as desired, by means of the respective retracting and feeding button switches 56 and 55.

The machine according to the invention will erode metals at a considerably greater speed than prior known arrangements, permitting complex dies and shapes to be produced in metals by use of an appropriately shaped electrode, particularly in hard metals, in a very short time as compared with prior conventional hand working or erosion methods. In practical tests, it has been found that one cubic inch can be eroded in tough or hard metals, in seven minutes, using an input of as little as only 4.8 k.v.a.

Furthermore, once the machine has been set and started, it will proceed with the desired erosion without supervision until completed, whereafter the whole electrode retracts, the tank empties and all other necessary operations to bring the machine to rest are performed automatically, entirely without supervision.

By the use of the alternator instead of an impulse generator as in prior known fast erosion machines, maintenance of the machine is reduced to a minimum, because there are no brushes or commutators to go wrong, as they do in prior machines due to the high current on the generator being transferred from the commutator to brushes. For the same reason an A.C. servo system 17, 48, 49, 50 is employed in the machine as shown in preference to a D.C. system.

By use of a transistorised amplifier 48, the number of components of the circuit likely to deteriorate in use is reduced to a minimum.

It is to be appreciated that the foregoing example illustrates only one form the invention may take and that variations may be made to the example without departing from the scope of the invention.

For instance, in the circuit illustrated there is preferably a protective arrangement comprising a capacitor and resistance connected across the output of the rectifier 23, to protect subsequent parts of the circuit (e.g. the diodes of the amplifier 28) against voltage surges.

What I claim is:

1. A spark erosion machine for erosion of workpiece comprising an alternator, a rectifier, an electrode, means operable to move said electrode relative to a workpiece in dependence upon a potential produced between said electrode and said workpiece by said alternator and said rectifier, means for closely stabilizing the current output of said alternator, an auxiliary relaxation capacitor circuit, switch means for selectively interposing said relaxation capacitor circuit between said alternator and said electrode in place of said rectifier, said auxiliary relaxation capacitor circuit including a plurality of capacitors of different capacitances, and secondary switch means for selectively including said capacitors into said auxiliary relaxation capacitor circuit, and safety means for preventing operation of said switch means while a workpiece is being eroded.

2. A spark erosion machine according to claim 1, wherein said rectifier includes a bank of silicon rectifier elements.

3. A spark erosion machine according to claim 1, wherein said means for closely stabilizing the current output of said alternator is a carbon pile current controller.

References Cited

UNITED STATES PATENTS

| | | | |
|---|---|---|---|
| 2,499,200 | 2/1950 | Somerville | 338—103 |
| 2,929,039 | 3/1960 | Neild | 338—103 |
| 2,980,787 | 4/1961 | Bruma | 219—69 |

FOREIGN PATENTS 799,531  8/1958  Great Britain.

OTHER REFERENCES

"Mechanical Engineering," Nat'l. Science Foundation, Washington, D.C., 1961, pp. 104, 108, 109.

RICHARD M. WOOD, *Primary Examiner.*

R. F. STAUBLY, *Assistant Examiner.*